United States Patent Office 3,275,334
Patented Sept. 27, 1966

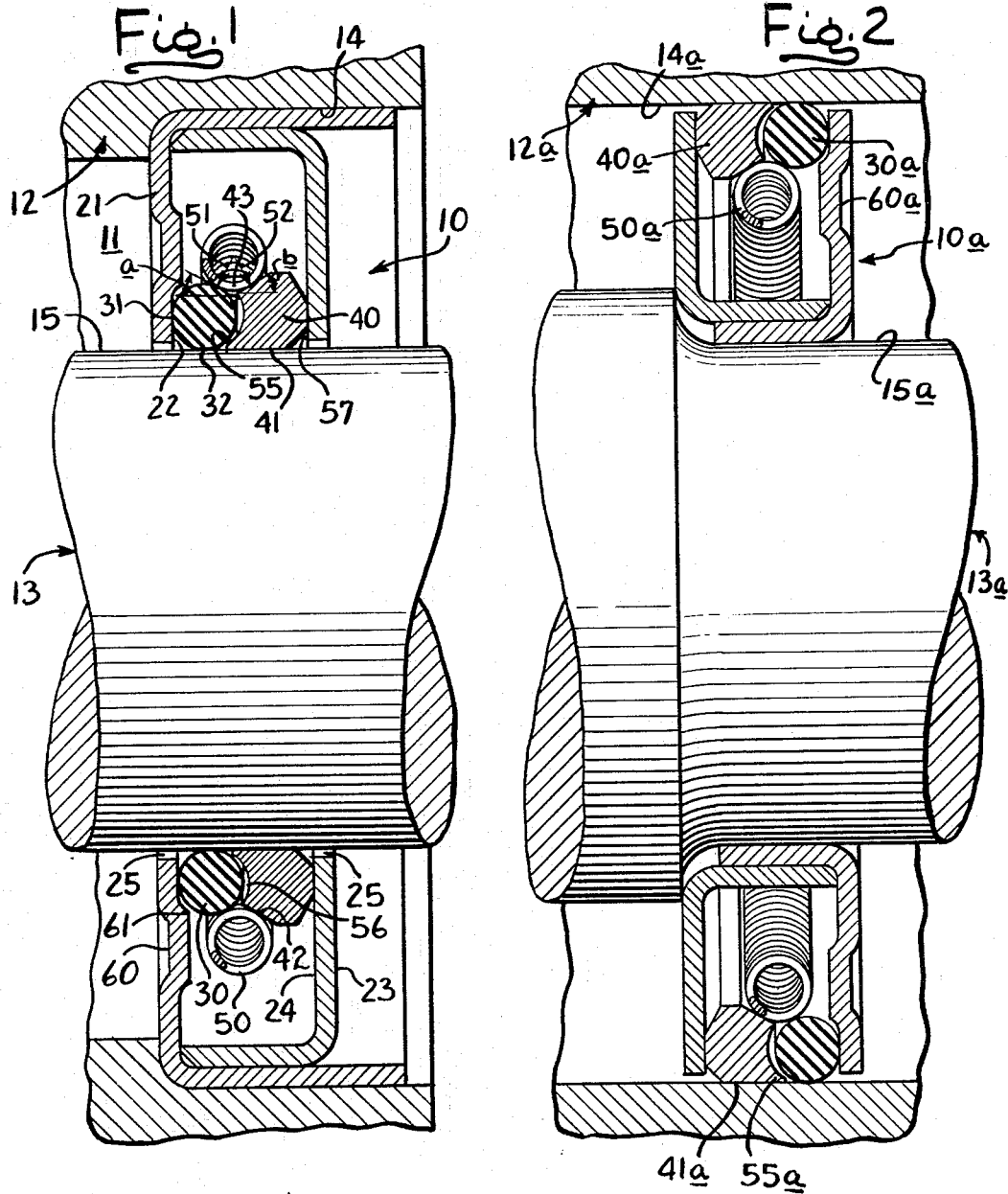

---

3,275,334
O-RING ROTARY SEAL CONSTRUCTION
Robert M. Voitik, Glenview, Ill., assignor to Continental Illinois National Bank and Trust Company of Chicago as trustee
Filed Dec. 18, 1963, Ser. No. 331,497
5 Claims. (Cl. 277—41)

The present invention relates to shaft seals and more particularly to an improved rotary seal of the O-ring type.

It is an object of the present invention to provide an O-ring cartridge seal construction which is efficient, reliable and consistent for applications involving moderate speed and pressure differential and which is inherently low in cost.

It is a more specific object of the present invention to provide a cartridge-type seal employing a garter spring and O-ring in which the garter spring is prestressed so that predetermined, relatively high per-unit forces are applied at the sealing surfaces but in which means are incorporated for preventing the O-ring from being squeezed out of position in the cartridge prior to installation. In this connection it is an object to provide an improved cartridge-type seal employing an O-ring, garter spring, and retaining ring in which all three elements are effectively locked together for relative rotation as a unit and in which the O-ring and retaining ring are free to move radially through a limited distance in the face of eccentricity or runout while nevertheless being maintained in approximately centered position relative to the cartridge so that the cartridge may be easily installed without risk of pinching or otherwise damaging the O-ring.

Other objects and advantages of the invention will become apparent upon reading the attached detailed description and upon reference to the drawing in which:

FIGURE 1 shows an axial section of a cartridge-type seal constructed in accordance with the present invention.

FIG. 2 is an axial half section of a seal similar to FIG. 1 but employing an expansion-type garter spring.

FIG. 3 is a vector diagram of the components of force exerted by the garter spring.

Turning now to the drawing there is disclosed a cartridge-type seal 10 intended for mounting in the annular space 11 between a housing or frame 12 and a shaft 13. The frame has a cylindrical surface 14 which is generally concentric with the annular surface 15 on the shaft.

The cartridge in the present instance is formed of two cups, a first cup 21 having an inner wall 22 and a second cup 23 having an inner wall 24. The cartridge is preferably press fitted into the cylindrical surface 14, and the walls 22, 24 are preferably extended into the vicinity of the shaft 13, defining annular clearance spaces 25 surrounding the shaft.

Mounted within the cartridge 10 is an O-ring 30 presenting arcuate sealing surfaces. The first sealing surface is the region 31 of augmented line contact with the inner wall 22 and the second is the region 32 of augmented line contact with the shaft. The term "augmented" contact is used since the O-ring is made of resilient rubber, or rubber-like synthetic material and, due to its resilience, and upon force being applied thereto, the theoretical line contact is connected to ribbon contact at the region of engagement.

In accordance with the present invention there is provided, adjacent the O-ring, a retaining ring formed of plastic or the like which is rotatable with the O-ring and which is profiled to define, with the O-ring, a shallow annular valley in which is mounted a garter spring which is prestressed for the application of axial and radial force components to the respective O-ring sealing surfaces. Thus I provide a plastic ring 40 having an internal gripping surface 41 and an angled spring-engaging surface 42 which forms one wall of the valley 43, the other wall being formed by the adjacent surface of the O-ring itself. Seated within this valley is a garter spring 50, in the present instance of the contracting type, presenting an angled force as indicated by the vector 51 against the O-ring and an angled force indicated by the vector 52 against the retaining ring. The garter spring 50, is so constructed that when it is in its natural stressed state, its diameter is less than shown in the drawing and so that when the garter spring is stretched to the encircling position shown upon installation in the cartridge, it is thereby "prestressed" so as to exert a substantial force against both the O-ring and the retaining ring. In the vector diagram shown in FIG. 3 the axial and radial components have been indicated by the subscripts "a" and "r" respectively. Where the diameter of the cylindrical surface 14 defining the recess is on the order of 1½″ and the diameter of the shaft is on the order of ¾″, the force 51 exerted against the O-ring may be on the order of 1.4 pounds making an obtuse angle with respect to the shaft axis resulting in a radial component of 1.12 pounds exerted against the shaft and 0.52 pound exerted against the inner wall 22 of the cartridge. Similarly, the force 52 exerted against the retaining ring may be on the order of 1.02 pounds resulting in a radial component of 0.88 pound against the shaft and 0.5 pound axially against the retaining ring. Preferably, and in accordance with one of the detailed aspects of the invention, the retaining ring 40 is split, i.e., discontinuous over a short peripheral gap so that the ring may flex inwardly under the urging of the garter spring for snug gripping of the shaft at the inner surface 41. This tends to insure that the retaining ring will rotate with the shaft, i.e., that the O-ring, retaining ring, and garter spring will all rotate as a unit with the shaft with relative slippage taking place at the sealing surface 31. It is preferred that the angles *a*, *b*, shown in FIG. 1 be relatively shallow so that the radial components of force will tend to predominate. If desired, the angle *b* of the retaining ring surface may be made shallower than angle "*a*" so that the retaining ring absorbs most of the inwardly directed force, leaving the O-ring to absorb only a minor portion of it, particularly where a strong spring 50 is used.

In accordance with one of the features of the present invention the retaining ring is preferably provided with a lip 55 which extends under the O-ring as shown for retaining the O-ring and supporting it in position in the cartridge prior to cartridge installation. Thus, where the garter spring 50 has substantial prestress and where there is a lage radial component of force squeezing the O-ring, the latter will engage and tend to be supported by the lip 55. In order to provide a distributed area of contact under such conditions and also to maintain close spacing between the O-ring and the retaining ring, the retaining ring may be arcuately scalloped to provide a mating surface 56 on the side adjacent the O-ring. By positively retaining the O-ring against inward deformation by the spring, the O-ring does not get in the way when the cartridge is telescoped over the shaft 13. In other words, the O-ring bulges inwardly to only a limited degree and presents a smooth arc on the portion which does project for camming of the latter onto the shaft.

It is, moreover, one of the detailed features of the invention that means are provided for maintaining the entire assembly of O-ring, garter spring, and retaining ring approximately centered with the cartridge and for insuring that the O-ring is maintained centered in the valley 43 between the O-ring and the retaining ring. This is accomplished in the present instance by providing an inward projection 60 on the wall 22 of the cartridge. Such inward projection provides an obstruction 61 which is sufficiently spaced from the O-ring so that the O-ring simply may move in response to eccentricity or runout of the shaft but with the radial clearance being limited so that the O-ring assembly is always maintained in a generally centered position for insertion of the shaft into the cartridge. Moreover, the projection 60 is located directly opposite the garter spring 50 so that the garter spring is prevented from moving, to the left in FIG. 1, over the top of the O-ring.

Since the retaining ring 40 grips the shaft, and is rotatable with it, the amount of clearance at the outer, i.e., right hand side, of the retaining ring is immaterial. Thus while zero clearance is shown at 57 in the drawing, the seal will function properly if there is some clearance present.

Since, in the embodiment of FIG. 1, the retaining ring, O-ring and garter spring all rotate with the shaft, the garter spring is subject to centrifugal forces, and a measure of protection is provided against an overspeed condition. Thus where the speed of the shaft approaches or exceeds the maximum speed rating, the increase in centrifugal force acting upon the spring tends to reduce the inward squeezing pressure of the spring and thus reduce both the radial and axial components of spring force. This reduces the force per unit area applied at the relatively sliding surface of the O-ring as well as the area in contact, tending to reduce the heat which tends to be generated at such surface under high speed conditions, and which, in an extreme case, might result in burn-up of the seal.

While the invention has been described in connection with a cartridge having an O-ring running in contact with a shaft, it will be apparent to one skilled in the art that the invention is not limited to the particular arrangement shown and that the construction may be inverted by use of a modified cartridge and an expansion-type garter spring so that sealing engagement occurs at the outer cylindrical surface 14, i.e., at the surface of the opening in the frame or housing. Thus, referring to FIG. 2, corresponding parts are indicated by corresponding reference numerals with the addition of subscript "a." In this embodiment the cartridge 10a is open at the periphery for outward presentation of the surfaces of the O-ring 30a and retaining ring 40a. Both of the latter elements are urged outwardly by means of an expansion-type garter spring 50a. The members are proportioned and the surfaces are angled just as in the preceding embodiments so that the type of vector diagram in FIG. 3 is applicable. The lip 55a in the embodiment of FIG. 2 serves to prevent undue projection of the O-ring under stress prior to installation and the projection 60a maintains the entire assembly of the cartridge in a generally centered condition so that no special care need be used in inserting the cartridge into its recess. The retaining ring 40a is preferably of split construction so that its surface 41a, under the urging of the garter spring, is capable of gripping the cylindrical surface 14 which it engages.

In the following claims the term "plastic or the like" is intended to cover plastics such as nylon or other materials having comparable physical characteristics. The term "garter spring" is intended to cover either the usual type garter spring capable of exerting force outwardly. The "split" in the ring which is referred to may be a line of severance which extends all the way through the ring at one point, or it may, without departing from the invention, be a series of cuts extending partially through the structure of the ring, weakening it sufficiently so that it is capable of dimensionally responding to the force exerted by the garter spring to provide the gripping action. Or, if desired, the retaining ring may be made of resilient material having a slightly interfering fit to provide the gripping action without having to rely upon the garter spring. The term "prestressed" refers to the fact that the spring, in both of the two versions has a "normal" diameter, when unstressed, which differs from its "working" diameter when in place in the cartridge, the working diameter being longer, to apply static inward stress in the embodiment of the FIG. 1, and smaller to apply outward stress, in the embodiment of FIG. 2. Thus the "squeezing force" referred to may be radially inward or radially outward.

In any event it will be apparent that a cartridge-type seal has been provided which is inherently simple and inexpensive and which is capable of operating at moderate speeds and in the face of moderate pressure differential. If desired, the space within the cartridge may be charged with lubricant in order to insure that the slipping face of the O-ring is adequately lubricated with respect to the surface which it engages.

I claim as my invention:

1. In a cartridge-type seal for insertion in the annular space between a shaft and a frame opening defining first and second concentric cylindrical surfaces, the combination comprising an annular cartridge having a first wall and a second wall, said walls being fixedly mounted with respect to the first cylindrical surface and extending to within the vicinity of the second cylindrical surface to define an annular clearance space with respect to the latter, an O-ring presenting arcuate sealing surfaces in engagement with the first wall of the cartridge and the second cylindrical surface respectively, a retaining ring of plastic or the like arranged adjacent the O-ring for mounting on said second cylindrical surface, said O-ring and retaining ring having adjacent portions of approximately the same radial thickness profiled to define a shallow annular valley between them, a garter spring in said valley, said garter spring being prestressed to exert both the retaining ring and O-ring angled forces having radial components in the same direction as well as axial components in opposite directions, said retaining ring being in gripping engagement with the second cylindrical surface to preclude relative movement between the O-ring and retaining ring.

2. In a cartridge-type seal for insertion in the annular space between a shaft and a frame opening defining first and second concentric cylindrical surfaces, the combination comprising an annular cartridge having a first wall and a second wall, said walls being fixedly mounted with respect to the first cylindrical surface and extending to within the vicinity of the second cylindrical surface to define a cylindrical clearance space with respect to the latter, an O-ring presenting arcuate sealing surfaces in engagement with the first wall of the cartridge and the second cylindrical surface respectively, a split retaining ring of plastic or the like arranged adjacent the O-ring for mounting on said second cylindrical surface, said O-ring and retaining ring having adjacent portions of approximately the same radial thickness profiled to define a shallow annular valley between them, a garter spring in said valley, said garter spring being prestressed to exert radial squeezing forces upon both the retaining ring and the O-ring.

3. In a cartridge-type seal for insertion in the annular space between a shaft and a frame opening defining first and second concentric cylindrical surfaces, the combination comprising an annular cartridge having a first wall and a second wall, said walls being fixedly mounted with respect to the first cylindrical surface and extending to within the vicinity of the second cylindrical surface to define an annular clearance space with respect to the latter, an O-ring presenting arcuate sealing surfaces in engagement with the first wall of the cartridge and in engagement with the second cylindrical surface respectively, a split retaining ring of plastic or the like arranged adjacent the O-ring for mounting on said second cylindrical surface, said O-ring and retaining ring having adjacent portions of approximately the same radial thickness profiled to define a shallow annular valley between them, a prestressed garter spring in said valley for exerting upon the O-ring and split ring, angled forces having both radial and axial components, and means for engaging the garter spring to prevent axial movement thereof and for thereby maintaining the garter spring seated in said valley.

4. In a cartridge-type seal for insertion in the annular space between a shaft and a frame opening defining first and second concentric cylindrical surfaces, the combination comprising an annular cartridge having a first wall and a second wall, said walls being fixedly mounted with respect to the first cylindrical surface and extending to within the vicinity of the second cylindrical surface to define an annular clearance space with respect to the latter, an O-ring presenting arcuate sealing surfaces in engagement with the first wall of the cartridge and the second cylindrical surface respectively, a retaining ring of plastic or the like arranged adjacent the O-ring for mounting on said second cylindrical surface, said O-ring and retaining ring having adjacent portions of approximately the same radial thickness profiled to define a shallow-angled annular valley between them, a prestressed garter spring in said valley, said retaining ring having a lip formed thereon extending under the O-ring for restraining the O-ring against excessive radial movement as a result of force exerted by the garter spring prior to installation of the seal.

5. In a cartridge-type seal for insertion in the annular space between a shaft and a frame opening defining first and second concentric cylindrical surfaces, the combination comprising means defining opposed annular walls, said walls being fixedly mounted with respect to the first cylindrical surface and extending to within the vicinity of the second cylindrical surface to define an annular clearance space with respect to the latter, an O-ring presenting arcuate sealing surfaces in engagement with the first wall of the cartridge and the second cylindrical surface respectively, a retaining ring of plastic or the like arranged adjacent the O-ring for mounting on the second cylindrical surface and in gripping engagement with the latter, a prestressed garter spring bearing against said O-ring in angular relation to provide axial and radial components of force for application to the O-ring sealing surfaces, said garter spring having means for supporting the same in the angled position, said retaining ring having a lip formed thereon extending partially under the O-ring for restraining the O-ring against excessive radial movement as a result of the radial component of force exerted by the garter spring prior to the installation of the seal.

References Cited by the Examiner

UNITED STATES PATENTS

| | | | |
|---|---|---|---|
| 2,747,903 | 5/1956 | Heinrich | 277—84 X |
| 3,069,174 | 12/1962 | Skinner | 277—143 X |
| 3,193,298 | 7/1965 | Voitik et al. | 277—40 |

FOREIGN PATENTS 1,040,859  10/1958  Germany.

SAMUEL ROTHBERG, *Primary Examiner.*